United States Patent
Qiu et al.

(10) Patent No.: US 12,386,190 B2
(45) Date of Patent: Aug. 12, 2025

(54) MULTI-FUNCTION METASURFACE BEAM SPLITTER

(71) Applicant: Shphotonics Ltd, Suzhou (CN)

(72) Inventors: Bing Qiu, Suzhou (CN); Lei Sun, Suzhou (CN)

(73) Assignee: SHPHOTONICS LTD, Suzhou (CN)

( * ) Notice: Subject to any disclaimer, the term of this patent is extended or adjusted under 35 U.S.C. 154(b) by 235 days.

(21) Appl. No.: 18/190,458

(22) Filed: Mar. 27, 2023

(65) Prior Publication Data

US 2023/0314824 A1 Oct. 5, 2023

(30) Foreign Application Priority Data

Mar. 31, 2022 (CN) .......................... 202210336943.6

(51) Int. Cl.
  *G02B 27/12* (2006.01)
  *G02B 1/00* (2006.01)
(52) U.S. Cl.
  CPC ........... *G02B 27/123* (2013.01); *G02B 1/002* (2013.01); *G02B 2207/101* (2013.01)

(58) Field of Classification Search
  CPC .................. G02B 27/123; G02B 1/002; G02B 2207/101
  USPC ......................................... 359/639
  See application file for complete search history.

(56) References Cited

U.S. PATENT DOCUMENTS

2022/0411856 A1* 12/2022 Narasimhan ......... C12Q 1/6844

\* cited by examiner

*Primary Examiner* — William Choi
(74) *Attorney, Agent, or Firm* — ANOVA LAW GROUP, PLLC

(57) ABSTRACT

A multi-function metasurface beam splitter includes at least two metalens arrays. Any metalens array of the at least two metalens arrays includes at least one metalens unit, and the at least two metalens arrays include a metalens unit set. The metalens unit set includes at least two metalens units with two different light processing functions, and a combination relationship among each metalens unit in the metalens unit set satisfies a first preset condition for realizing a preset function. The preset function refers to a light processing function of the multi-function metasurface beam splitter. A combination relationship among the at least two metalens arrays satisfies a second preset condition for realizing the preset function.

11 Claims, 1 Drawing Sheet

MULTI-FUNCTION METASURFACE BEAM SPLITTER

CROSS-REFERENCE TO RELATED APPLICATION

This application claims priority to Chinese Application No. 202210336943.6, filed on Mar. 31, 2022, the entire content of which is incorporated herein by reference.

TECHNICAL FIELD

The present disclosure relates to the optics technology and, in particular, to a multi-function metasurface beam splitter.

BACKGROUND

Beam splitter is an optical component that splits a single incident light beam into multiple beams. A conventional splitter plate can only split light into two beams, lacking the ability to split light further. Diffractive optical elements (DOEs) can realize hundreds to thousands of output beams, which can also be arranged in a one-dimensional, a two-dimensional, or a spot array. The DOE beam splitters enable customization according to the number of output beams, angles between output beams, and arrangement of output beams.

However, conventional beam splitters are usually made of plastic materials, which impairs their temperature stability. This shortcoming renders them unsuitable for high-temperature applications. Further, each type of such beam splitters can only realize a single-mode beam-splitting function, which limits their versatility.

SUMMARY

One aspect of the present disclosure provides a multi-function metasurface beam splitter comprising at least two metalens arrays. Any metalens array of the at least two metalens arrays includes at least one metalens unit, and the at least two metalens arrays include a metalens unit set. The metalens unit set includes at least two metalens units with two different light processing functions, and a combination relationship among each metalens unit in the metalens unit set satisfies a first preset condition for realizing a preset function. The preset function refers to a light processing function of the multi-function metasurface beam splitter. A combination relationship among the at least two metalens arrays satisfies a second preset condition for realizing the preset function.

Figure 1:
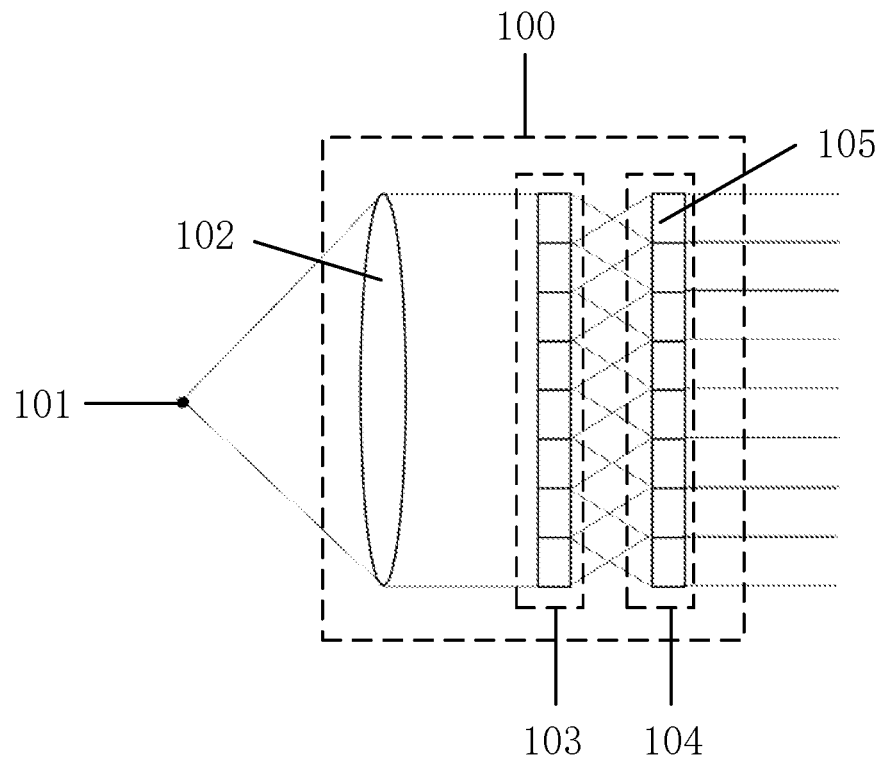
FIG. 1 is a side view of an exemplary multi-function metasurface beam splitter according to some embodiments of the present disclosure.

Numerical labels in the drawings include:
101 point light source
102 lens
103 first metalens array
104 second metalens array
105 metalens unit
201 third metalens array
202 fourth metalens array
203 substrate

DETAILED DESCRIPTION OF THE EMBODIMENTS

In the following, some example embodiments are described. As those skilled in the art would recognize, the described embodiments can be modified in various different manners, all without departing from the spirit or scope of the present disclosure. Accordingly, the drawings and descriptions are illustrative in nature and not limiting.

In the present disclosure, terms such as "first," "second," and "third" can be used to describe various elements, components, regions, layers, and/or parts. However, these elements, components, regions, layers, and/or parts should not be limited by these terms. These terms are only used to distinguish one element, component, region, layer, or part from another element, component, region, layer, or layer. Therefore, a first element, component, region, layer, or part discussed below can also be referred to as a second element, component, region, layer, or part, which does not constitute a departure from the teachings of the present disclosure.

A term specifying a relative spatial relationship, such as "below," "beneath," "lower," "under," "above," or "higher," can be used in the disclosure to describe the relationship of one or more elements or features relative to other one or more elements or features as illustrated in the drawings. These relative spatial terms are intended to also encompass different orientations of the device in use or operation in addition to the orientation shown in the drawings. For example, if the device in the a drawing is turned over, an element described as "beneath," "below," or "under" another element or feature would then be "above" the other element or feature. Therefore, an example term such as "beneath" or "under" can encompass both above and below. Further, a term such as "before," "in front of," "after," or "subsequently" can similarly be used, for example, to indicate the order in which light passes through the elements. A device can be oriented otherwise (e.g., being rotated by 90 degrees or being at another orientation) while the relative spatial terms used herein still apply. In addition, when a layer is referred to as being "between" two layers, it can be the only layer between the two layers, or there can be one or more intervening layers.

Terminology used in the disclosure is for the purpose of describing the embodiments only and is not intended to limit the present disclosure. As used herein, the terms "a," "an," and "the" in the singular form are intended to also include the plural form, unless the context clearly indicates otherwise. Terms such as "comprising" and/or "including" specify the presence of stated features, entities, steps, operations, elements, and/or parts, but do not exclude the existence or addition of one or more other features, integers, steps, operations, elements, parts, and/or combinations thereof. As used herein, the term "and/or" includes any and all combinations of one or more of the listed items. The phrases "at least one of A and B" and "at least one of A or B" mean only A, only B, or both A and B.

When an element or layer is referred to as being "on," "connected to," "coupled to," or "adjacent to" another element or layer, the element or layer can be directly on, directly connected to, directly coupled to, or directly adjacent to the other element or layer, or there can be one or more intervening elements or layers. In contrast, when an element or layer is referred to as being "directly on," "directly connected to," "directly coupled to," or "directly adjacent to" another element or layer, then there is no intervening element or layer. "On" or "directly on" should not be interpreted as requiring that one layer completely covers the underlying layer.

In the disclosure, description is made with reference to schematic illustrations of example embodiments (and intermediate structures). As such, changes of the illustrated shapes, for example, as a result of fabrication techniques and/or tolerances, can be expected. Thus, embodiments of the present disclosure should not be interpreted as being limited to the specific shapes of regions illustrated in the drawings, but are to include deviations in shapes that result, for example, from fabrication. Therefore, the regions illustrated in the drawings are schematic and their shapes are not intended to illustrate the actual shapes of the regions of the device and are not intended to limit the scope of the present disclosure.

Unless otherwise defined, all terms (including technical and scientific terms) used herein have the same meaning as commonly understood by those of ordinary skill in the art to which this disclosure belongs. Terms such as those defined in commonly used dictionaries should be interpreted to have meanings consistent with their meanings in the relevant field and/or in the context of this disclosure, unless expressly defined otherwise herein.

As used herein, the term "substrate" can refer to the substrate of a diced wafer, or the substrate of an un-diced wafer. Similarly, the terms "chip" and "die" can be used interchangeably, unless such interchange would cause conflict. The term "layer" can include a thin film, and should not be interpreted to indicate a vertical or horizontal thickness, unless otherwise specified.

The present disclosure provides a multi-function metasurface beam splitter. The metasurface beam splitter may be used in extreme environment, and may realize multi-function integration.

The multi-function metasurface beam splitter is described in detail below through various embodiments of the present disclosure.

FIG. 1 is a side view of an exemplary multi-function metasurface beam splitter 100 according to some embodiments of the present disclosure. As shown in FIG. 1, the multi-function beam splitter 100 includes at least two metalens arrays.

Any metalens array in the at least two metalens arrays includes at least one metalens unit. The at least two metalens arrays includes a metalens unit set. The metalens unit set includes at least two metalens units with different light processing functions. A combination relationship of various metalens units in the metalens unit set satisfies a first preset condition for realizing a preset function, and the preset function refers to a light processing function of the multi-function metasurface beam splitter. A combination relationship of the at least two metalens arrays satisfies a second preset condition for realizing the preset function. In this disclosure, the combination relationship of various components (such as metalens units or metalens arrays) refers to how such components are combined, arranged, and/or assembled.

As shown in FIG. 1, the multi-function metasurface beam splitter (also simply referred to as beam splitter) 100 includes a first metalens array 103 and a second metalens array 104. A point light source 101 is used to emit a light beam that is incident on the beam splitter. Each of the first metalens array 103 and the second metalens array 104 includes a plurality of metalens units 105. The first metalens array 103 and the second metalens array 104 are arranged in parallel. In some embodiments, the first metalens array 103 and the second metalens array 104 can completely overlap with each other when viewed in a direction of the incident light. The plurality of metalens units in the first metalens array 103 are closely coupled together to form the first metalens array 103, and the plurality of metalens units in the second metalens array 104 are closely coupled together to form the second metalens array 104. The above description of the multi-function metasurface beam splitter 100 is merely illustrative, and does not constitute a limitation to the multi-function metasurface beam splitter provided by the embodiments of the present disclosure.

In some embodiments, the first preset condition for realizing the preset function satisfied by the combination relationship of various metalens units in the metalens unit set includes that the various metalens units in the metalens unit set satisfy a first combination relationship, and the first combination relationship is used to enable split light beams to achieve at least one of the following functions: convergence, divergence, collimation, polarization conversion, filtering, deflection, and intensity variation, etc.

In some embodiments, through different permutations and combinations of the plurality of metalens units in the metalens unit set, the multi-function metasurface beam splitter can realize a variety of different optical functions (i.e., light processing function). The optical functions that the multi-function metasurface beam splitter can realize include but not limited to the above-described optical functions. Other functions may also be realized. The permutations and combinations of the plurality of metalens units in the metalens unit set may be determined according to the desired functions of the multi-function metasurface beam splitter, such that the multi-function metasurface beam splitter not only can realize the beam splitting function, but also can realize other functions.

In some embodiments, the second preset condition for realizing the preset function satisfied by the combination relationship of the at least two metalens arrays includes that, when faces of all the metalens units in any metalens array of the at least two metalens arrays receiving incident light are on a same plane, the faces of the at least two metalens arrays receiving the incident light are separated from each other and arranged in parallel, or an angle formed between two adjacent faces among the faces of the at least two metalens arrays receiving the incident light is a preset angle. In this disclosure, a face of a metalens unit that receives incident light is also referred to as a "light-receiving face" of the metalens unit.

In some embodiments, as shown in FIG. 1, the first metalens array 103 and the second metalens array 104 are arranged in parallel, and a number of the metalens units in the first metalens array 103 is equal to a number of the metalens units in the second metalens array 104. A positional relationship of the at least two metalens arrays includes but is not limited to that shown in the figure. For example, the at least two metalens arrays may be configured according to the preset angle. By changing the positional relationship of the at least two metalens arrays, different light processing functions may be achieved. The multi-function metasurface beam splitter 100 is merely illustrative, and does not constitute a limitation to the multi-function metasurface beam splitter provided by the embodiments of the present disclosure.

In some embodiments, a diameter and/or a deflection angle of the split light beams may be adjusted by adjusting a distance between adjacent metalens units in the at least two metalens arrays, and/or a size, a focal length, and/or a nanostructure of any metalens unit.

In some embodiments, according to the focal length of the plurality of metalens units 105, the distance between the first metalens array 103 and the second metalens array 104, and/or the size, the focal length, and/or the nanostructure of any metalens unit may be adjusted to adjust the diameter and/or the deflection angle of the split light beams. Thus, the relative positional relationship of the two metalens arrays and/or the size of the plurality of metalens units can be obtained as needed.

In some embodiments, the multi-function metasurface beam splitter further includes a lens 102. The lens 102 is arranged between the point light source 101 and one metalens array of the at least two metalens arrays that receives the incident light from the point light source, and is configured to expand the incident light from the point light source 101 into a large light beam.

In some embodiments, as shown in FIG. 1, the lens 102 is arranged between the point light source 101 and the first metalens array 103. The lens 102 is configured to expand the incident light from the point light source 101 into the large light beam, such that the large light beam after beam expansion covers all the metalens units in the first metalens array 103. The lens 102 includes but is not limited to a conventional lens, a diffractive device, or a metalens, as long as it is an optical device that functions as a lens.

In some embodiments, the multi-function metasurface beam splitter also includes a substrate. The substrate is configured to transmit or reflect multiple light beams emitted from the at least two metalens arrays.

Figure 2:
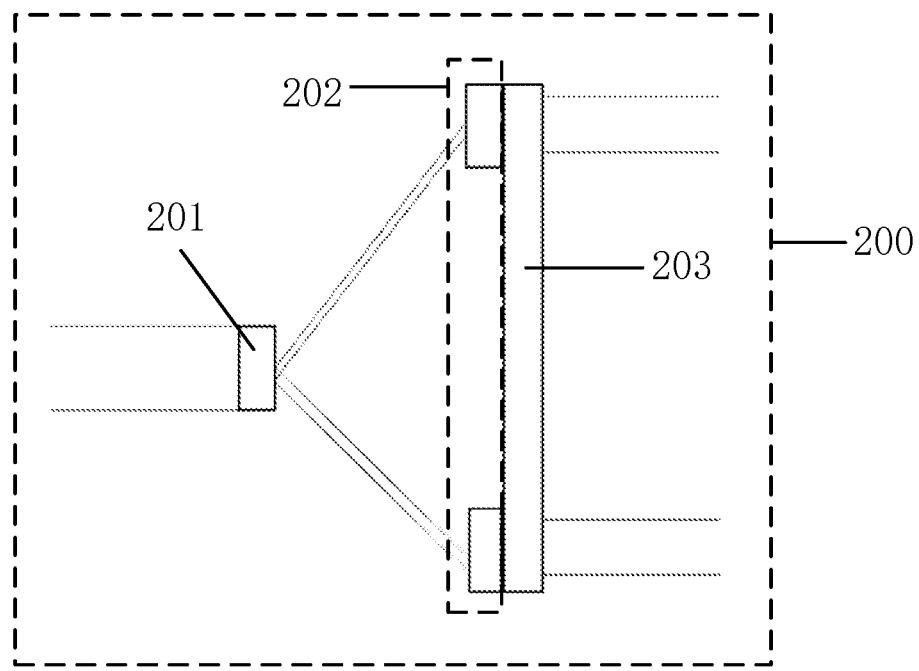
FIG. 2 is a side view of another exemplary multi-function metasurface beam splitter according to some embodiments of the present disclosure.

FIG. 2 is a side view of another exemplary multi-function metasurface beam splitter 200 according to some embodiments of the present disclosure. In some embodiments, as shown in FIG. 2, the multi-function metasurface beam splitter 200 includes a third metalens array 201 and a fourth metalens array 202. In some scenarios, the incident light is a parallel incident light. The third metalens array 201 includes one metalens unit, and the fourth metalens array 202 includes two metalens units that are arranged separately. The multi-function metasurface beam splitter 200 further includes a substrate 203 arranged behind and adjacent to the fourth metalens array 202. The substrate 203 can completely receive the split light beams that emitted from the fourth metalens array 202. The multi-function metasurface beam splitter 200 is merely illustrative, and does not constitute a limitation to the multi-function metasurface beam splitter provided by the embodiments of the present disclosure.

In some embodiments, as shown in FIG. 2, the substrate 203 is arranged behind the fourth metalens array 202. The substrate 203 may be made of a material that is different from the fourth metalens array 202. The substrate 203 is configured to transmit or reflect the split light beams emitted from the fourth metalens array 202.

In some embodiments, the metalens unit set includes at least two metalens units with different light processing functions, which includes that the at least two metalens units have different processing effects on at least one of the following parameters of the incident light: a light beam diameter, a light beam shape, a light beam wavelength, a deflection angle, a transmittance efficiency, and a focal length.

In some embodiments, all the metalens units in the metalens unit set may be metalens units have different processing effects on at least two parameters. The processing parameters include but not limited to the light beam diameter, the light beam shape, the light beam wavelength, the deflection angle, the transmittance efficiency, and the focal length. All the metalens units in the metalens unit set may also be metalens units performing other light processing functions. Through different light processing functions of the plurality of metalens units, different effects can be achieved. Combined with the preset positional relationship among the plurality of metalens units, the multi-function metasurface beam splitter may be used to perform light processing functions other than the light beam splitting, such as convergence, divergence, collimation, polarization conversion, filtering, deflection, intensity variation, and the like.

In some embodiments, surfaces of various metalens units in the metalens unit set include a plurality of nanostructures. The plurality of nanostructures may have different light processing functions. The plurality of nanostructures may include nanopillars and/or nanopores.

In some embodiments, the light processing functions of the plurality of nanostructures include changing phase, changing chromatic aberration, changing polarization, changing amplitude, and/or changing frequency.

In some embodiments, each metalens unit is a metasurface device including a plurality of nanopillars on the surface of the metalens unit. Different materials, structures, positions, shapes, periods, arrangements, and/or heights of the plurality of nanopillars may be configured to modulate a wavefront of the incident light, including but not limited to reducing or increasing chromatic aberration, modulating polarization, amplitude, and frequency, etc., such that the light beam passing through various metalens units is processed accordingly to achieve different preset light processing functions.

In some embodiments, materials of the lens 102, the substrate 203, and the nanostructures are all inorganic materials, including but not limited to silicon, silicon oxide, silicon nitride, titanium oxide, gallium nitride, and/or other inorganic materials.

In embodiments of the present disclosure, the material of the metalens units has strong environmental adaptability, such that the multi-function metasurface beam splitter provided by the present disclosure can be applied to various extreme environments, such as high temperature or low temperature scenarios. In addition, the metalens units with different light processing functions and different combinations of multiple metalens units according to preset functions enable the multi-function metasurface beam splitter provided by the present disclosure to achieve multi-function integration. The light processing functions include but are not limited to beam splitting, converging, diverging, collimating, polarization conversion, filtering, beam deflection, and intensity variation.

While various embodiments of the present disclosure have been described, additional changes and modifications to these embodiments may be made by those skilled in the art once the basic inventive concept is appreciated. Therefore, disclosures are intended to be construed to cover embodiment and all changes and modifications which fall within the scope of the disclosure.

Several different embodiments or examples are described in the present disclosure. These embodiments or examples are exemplary and are not intended to limit the scope of the present disclosure. Those skilled in the art can conceive of various modifications or substitutions based on the disclosed contents, and such modifications and substitutions should be included in the scope of the present disclosure. A true scope and spirit of the invention is indicated by the following claims.

What is claimed is:

1. A multi-function metasurface beam splitter comprising:
a plurality of metalens units arranged to form at least two metalens arrays each including at least one of the plurality of metalens units;
wherein:
   at least two metalens units of the plurality of metalens units have different light processing functions;
   a combination relationship of the plurality of metalens units satisfies a first preset condition for realizing a preset function for processing light;
   a combination relationship of the at least two metalens arrays satisfies a second preset condition for realizing the preset function; and
   at least one of a distance between adjacent metalens units in the at least two metalens arrays, or a size, a focal length, or a nanostructure of any of the metalens units is adjustable to adjust at least one of a diameter or a deflection angle of a split light beam.

2. The multi-function metasurface beam splitter of claim 1, wherein the first preset condition includes that:
the combination relationship of the plurality of metalens units realizes one or more of following functions for split light: convergence, divergence, collimation, polarization conversion, filtering, deflection, and intensity variation.

3. The multi-function metasurface beam splitter of claim 1, wherein the second preset condition includes that:
light-receiving faces of all of the metalens units of one of the at least two metalens arrays are on a same plane; and
the light-receiving faces of the at least two metalens arrays are separated from each other and arranged in parallel.

4. The multi-function metasurface beam splitter of claim 1, wherein the second preset condition includes that:
light-receiving faces of all of the metalens units of one of the at least two metalens arrays are on a same plane; and
an angle formed between two adjacent ones of the light-receiving faces of the at least two metalens arrays is a preset angle.

5. The metasurface optical device of claim 1, further comprising:
a lens configured to be arranged between a point light source and one of the at least two metalens arrays, and to expand incident light into a light beam.

6. The metasurface optical device of claim 1, further comprising:
a substrate configured to transmit or reflect multiple light beams emitted from the at least two metalens arrays.

7. The metasurface optical device of claim 1, wherein the at least two metalens units with different light processing functions have different light processing effects on at least one of following parameters: a light beam diameter, a light beam shape, a light beam wavelength, a deflection angle, a transmittance efficiency, and a focal length.

8. The metasurface optical device of claim 1, wherein:
surfaces of the plurality of metalens units include a plurality of nanostructures having different light processing functions.

9. The metasurface optical device of claim 8, wherein:
the plurality of nanostructures are configured to change at least one of phase, chromatic aberration, polarization, amplitude, or frequency of incident light.

10. A multi-function metasurface beam splitter comprising:
a plurality of metalens units arranged to form at least two metalens arrays each including at least one of the plurality of metalens units; and
a lens configured to be arranged between a point light source and one of the at least two metalens arrays, and to expand incident light into a light beam;
wherein:
   at least two metalens units of the plurality of metalens units have different light processing functions;
   a combination relationship of the plurality of metalens units satisfies a first preset condition for realizing a preset function for processing light; and
   a combination relationship of the at least two metalens arrays satisfies a second preset condition for realizing the preset function.

11. A multi-function metasurface beam splitter comprising:
a plurality of metalens units arranged to form at least two metalens arrays each including at least one of the plurality of metalens units; and
a substrate configured to transmit or reflect multiple light beams emitted from the at least two metalens arrays;
wherein:
   at least two metalens units of the plurality of metalens units have different light processing functions;
   a combination relationship of the plurality of metalens units satisfies a first preset condition for realizing a preset function for processing light; and
   a combination relationship of the at least two metalens arrays satisfies a second preset condition for realizing the preset function.

* * * * *